(12) United States Patent
Montojo et al.

(10) Patent No.: US 9,749,027 B2
(45) Date of Patent: Aug. 29, 2017

(54) REFERENCE SIGNAL DESIGN FOR LTE A

(71) Applicant: QUALCOMM Incorporated, San Diego, CA (US)

(72) Inventors: Juan Montojo, San Diego, CA (US); Ravi Palanki, San Diego, CA (US); Amir Farajidana, San Diego, CA (US); Kapil Bhattad, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/205,808

(22) Filed: Mar. 12, 2014

(65) Prior Publication Data

US 2014/0192919 A1    Jul. 10, 2014

Related U.S. Application Data

(62) Division of application No. 12/561,984, filed on Sep. 17, 2009, now Pat. No. 8,676,133.

(Continued)

(51) Int. Cl.
*H04W 72/00*    (2009.01)
*H04B 7/06*    (2006.01)
(Continued)

(52) U.S. Cl.
CPC ........... *H04B 7/061* (2013.01); *H04B 7/0691* (2013.01); *H04L 5/0091* (2013.01);
(Continued)

(58) Field of Classification Search
USPC ........ 455/82, 517, 513, 500, 424, 422.1, 25, 455/16, 13.3, 13.1, 102, 101, 522, 502;
(Continued)

(56) References Cited

U.S. PATENT DOCUMENTS 6,836,673 B1    12/2004 Trott
7,305,235 B2    12/2007 Doi
(Continued)

FOREIGN PATENT DOCUMENTS

JP    2003534705 A    11/2003
JP    2007215008 A    8/2007
(Continued)

OTHER PUBLICATIONS

LG Electronics, et al., "CDD-based Precoding for E-UTRA downlink MIMO", 3GPP TSG RAN WG1 Meeting#47, Nov. 2006, pp. 1-6, R1-063345.
(Continued)

*Primary Examiner* — Ganiyu A Hanidu
(74) *Attorney, Agent, or Firm* — Liem T. Do

(57) ABSTRACT

Systems and methods are disclosed that facilitate creating antenna ports to correspond to two or more groups of user equipment. The systems and methods can organize two or more groups of user equipment and signal to each of the two or more groups a respective antenna port. The systems and methods can further communicate mapping information, a reference signal, or delay related to a linear combination in order to identify antenna ports. Based on such communicated information, the reference signal can be decoded in order to identify each antenna port.

17 Claims, 11 Drawing Sheets

Related U.S. Application Data

(60) Provisional application No. 61/098,738, filed on Sep. 19, 2008, provisional application No. 61/108,800, filed on Oct. 27, 2008.

(51) Int. Cl.
   *H04W 72/12* (2009.01)
   *H04L 5/00* (2006.01)
   *H04B 7/08* (2006.01)

(52) U.S. Cl.
   CPC ......... *H04W 72/1273* (2013.01); *H04B 7/063* (2013.01); *H04B 7/0632* (2013.01); *H04B 7/0634* (2013.01); *H04B 7/0671* (2013.01); *H04B 7/0874* (2013.01)

(58) Field of Classification Search
   USPC ............... 370/448, 349, 338, 329, 208, 267
   See application file for complete search history.

(56) References Cited

U.S. PATENT DOCUMENTS

| | | | |
|---|---|---|---|
| 7,493,406 B2 | 2/2009 | Amini et al. | |
| 7,925,253 B2 | 4/2011 | Breit et al. | |
| 7,961,640 B2 | 6/2011 | Prakash et al. | |
| 8,660,601 B2* | 2/2014 | Seo | H04B 7/024 |
| | | | 455/127.1 |
| 2002/0028655 A1 | 3/2002 | Rosener et al. | |
| 2003/0016174 A1* | 1/2003 | Anderson | G01S 5/02 |
| | | | 342/378 |
| 2003/0045233 A1 | 3/2003 | Doi | |
| 2005/0120097 A1 | 6/2005 | Walton et al. | |
| 2006/0209670 A1 | 9/2006 | Gorokhov et al. | |
| 2007/0049218 A1 | 3/2007 | Gorokhov et al. | |
| 2007/0097910 A1 | 5/2007 | Ji et al. | |
| 2008/0132281 A1* | 6/2008 | Kim | H04B 7/063 |
| | | | 455/562.1 |
| 2008/0192856 A1* | 8/2008 | Jongren | H04B 7/0617 |
| | | | 375/267 |
| 2008/0273452 A1 | 11/2008 | Khan et al. | |
| 2009/0060088 A1* | 3/2009 | Callard | H04W 72/005 |
| | | | 375/299 |
| 2009/0073958 A1* | 3/2009 | Xu | H04L 65/80 |
| | | | 370/352 |
| 2009/0276684 A1* | 11/2009 | Stewart | H04L 1/0032 |
| | | | 714/758 |
| 2009/0322613 A1 | 12/2009 | Bala et al. | |
| 2010/0034312 A1 | 2/2010 | Muharemovic et al. | |
| 2010/0046651 A1* | 2/2010 | Jongren | H04B 7/0689 |
| | | | 375/260 |
| 2010/0075706 A1 | 3/2010 | Montojo et al. | |
| 2010/0272032 A1* | 10/2010 | Sayana | H04B 7/024 |
| | | | 370/329 |
| 2011/0103338 A1* | 5/2011 | Astely | H04J 11/0069 |
| | | | 370/329 |
| 2011/0159901 A1* | 6/2011 | Frenger | H04L 5/0082 |
| | | | 455/502 |
| 2011/0216845 A1 | 9/2011 | Nakao et al. | |

FOREIGN PATENT DOCUMENTS

| | | |
|---|---|---|
| KR | 20000077044 A | 12/2000 |
| KR | 20010107770 A | 12/2001 |
| WO | WO-0191318 A1 | 11/2001 |
| WO | WO-2005055527 A1 | 6/2005 |
| WO | WO-2007051181 | 5/2007 |
| WO | WO-2007117127 A1 | 10/2007 |
| WO | WO-2008031112 A2 | 3/2008 |
| WO | 2008050745 A1 | 5/2008 |
| WO | WO-2008103805 A2 | 8/2008 |
| WO | WO-2009025081 A1 | 2/2009 |

OTHER PUBLICATIONS

International Search Report and Written Opinion—PCT/US2009/057581—ISA/EPO—Mar. 11, 2010.

Motorola: "Common Reference Symbol Mapping/Signaling for 8 Transmit Antennas" 3GPP Draft; R1-083224-8 CRS Techniques, 3rd Generation Partnership Project (3GPP), Mobile Competence Centre ; 650, Route Des Lucioles ; F-06921 Sophia-Antipolis Cedex—France, No. Jeju; Aug. 12, 2008, Aug. 12, 2008 (Aug. 12, 2008), XP050316638.

Motorola: "Downlink Multiple Antenna Schemes for LTE-Advanced" 3GPP Draft; R1-083228 LTE-A DL MIMO Motorola, 3rd Generation Partnership Project (3GPP), Mobile Competence Centre ; 650, Route Des Lucioles ; F-06921 Sophia-Antipolis Cedex ; France, No. Jeju; Aug. 12, 2008, Aug. 12, 2008 (Aug. 12, 2008), XP050316642 [retrieved on Aug. 12, 2008] p. 1, paragraph 1—p. 2, paragraph 3.

Taiwan Search Report—TW098131837—TIPO—Mar. 1, 2013.

Nortel: "RS design considerations for high-order MIMO in LTE-A" TSG-RAN1 #54, R1-083157, [Online] Aug. 12, 2008 (Aug. 12, 2008), pp. 1-6, XP002561739 Retrieved from the Internet: URL:http://www.3gpp.org/ftp/tsg-ran/WGl-RL l/TSGRl_54/Docs/> [retrieved on 2009-12-29] p. 2-p. 5.

* cited by examiner

REFERENCE SIGNAL DESIGN FOR LTE A

CROSS-REFERENCE TO RELATED APPLICATIONS

The present Application for Patent is a Divisional of U.S. patent application Ser. No. 12/561,984, filed Sep. 17, 2009, entitled "REFERENCE SIGNAL DESIGN FOR LTE A," pending, which claims the benefit of U.S. Provisional Patent application Ser. No. 61/098,738 entitled "METHODS, SYSTEMS AND APPARATUS FOR REFERENCE SIGNAL DESIGN IN WIRELESS COMMUNICATION NETWORKS" which was filed Sep. 19, 2008 and U.S. Provisional Patent application Ser. No. 61/108,800 entitled "METHODS, SYSTEMS AND APPARATUS FOR REFERENCE SIGNAL DESIGN IN WIRELESS COMMUNICATION NETWORKS" which was filed Oct. 27, 2008. The entireties of the aforementioned applications are herein incorporated by reference.

BACKGROUND

I. Field

The following description relates generally to wireless communications, and more particularly to reference signal design to support legacy user equipment in LTE A.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Having multiple transmit antennas in wireless systems helps in getting transmit diversity and/or higher data rate. Transmit diversity relates to the performance improvement obtained when a signal is sent multiple times over different transmit antennas. The key idea is that, when the channel gains from different transmit antennas are independent, the chances of the channel gain from different transmit antennas to the user equipments (UEs) being small simultaneously decreases exponentially as the number of transmit antennas is increased. Probability of failure in this case is approximately $p^{Nt}$ where p is the probability of failure when only one transmit antenna is used and Nt is the number of transmit antennas used. On the other hand if the signal was sent from the same antenna multiple times, if the channel was bad in the first instance, it is likely to be bad for the remaining transmissions and hence the probability of failure continues to be equal to p (approximately).

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method that facilitates identifying a set of antenna ports is provided. The method can comprise receiving a mapping information that includes at least one of a delay and a linear combination employed to transmit a reference signal related to the set of antenna ports. Further, the method can comprise receiving a reference signal related to the antenna ports. Moreover, the method can include decoding, based on the mapping information, the reference signal related to the set in order to identify each antenna port.

Another aspect relates to an apparatus for wireless communication. The apparatus can include at least one processor configured to receive a mapping information that includes at least one of a delay and a linear combination employed to transmit a reference signal related to the set of antenna ports, receive a reference signal related to the antenna ports, and decode, based on the mapping information, the reference signal related to the set in order to identify each antenna port. Further, the wireless communications apparatus can include memory coupled to the at least one processor.

Another aspect relates to a wireless communications apparatus that identifies a set of antenna ports within a wireless communications environment. The wireless communications apparatus can comprise means for receiving a mapping information that includes at least one of a delay and a linear combination employed to transmit a reference signal related to the set of antenna ports. Moreover, the wireless communications apparatus can comprise means for receiving a reference signal related to the antenna ports. Further, the wireless communications apparatus can include means for decoding, based on the mapping information, the reference signal related to the set in order to identify each antenna port.

Still another aspect relates to a computer program product comprising a computer-readable medium having stored thereon code for causing at least one computer to receive a mapping information that includes at least one of a delay and a linear combination employed to transmit a reference signal related to the set of antenna ports, receive a reference signal related to the antenna ports, and decode, based on the mapping information, the reference signal related to the set in order to identify each antenna port.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
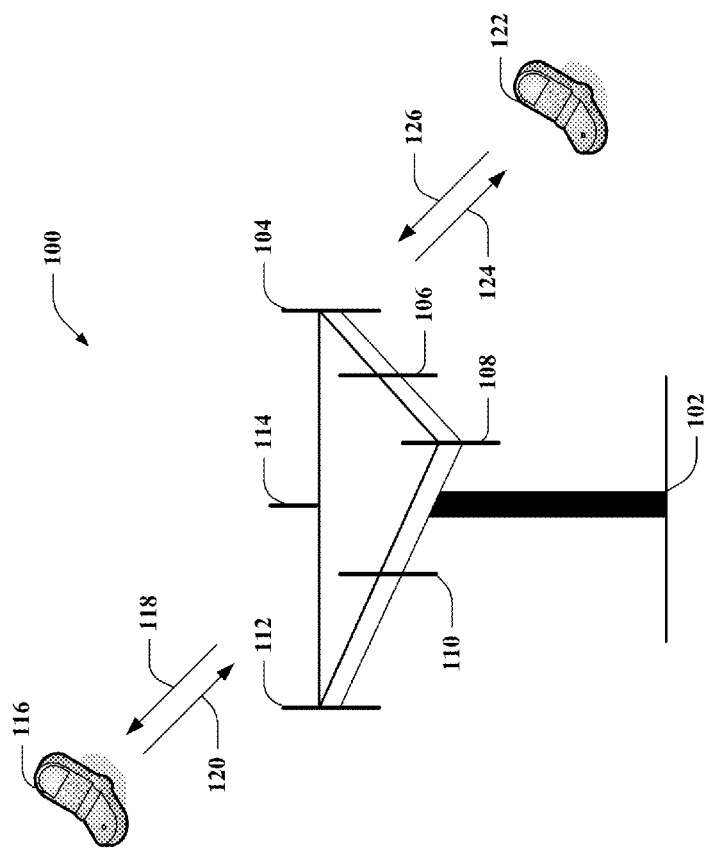
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "module," "carrier," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, . . . ). For instance, base station 102 can utilize a particular technology for communicating with mobile devices (e.g., mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (Wi-MAX), MediaFLO, Digital Multimedia Broadcasting (DMB), Digital Video Broadcasting—Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g., to a mobile device communicating via the second technology). For example, the pilot can use bit(s) to carry information about the presence of the first technology. Additionally, information such as a SectorID of the sector utilizing the first technology, a Carrierindex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

The subject innovation can organize a number of transmit antenna into a number of virtual antennas (e.g., also referred to as a group, a group of antenna, a group of transmit antenna, etc.) in order to allow legacy user equipment to utilize the entire number of transmit antenna. In particular, legacy user equipment may be able to utilize only up to four (4) transmit antenna ports (e.g., created antenna ports for a group of UEs). Within wireless communication systems that employ four or more transmit antenna, a legacy user equipment can not utilize more than four transmit antenna ports. The subject innovation can group the four or more transmit antenna into virtual antennas by employing a linear combination (e.g., linear combination on physical antennas, etc.) for example and using the virtual antennas as transmit antenna ports that a legacy user equipment can utilize therefore allowing the legacy user equipment to leverage more than four transmit antenna. In other words, virtual antennas can be created such that legacy user equipment can leverage additional transmit antenna (e.g., more than four transmit antenna). The subject innovation can further communicate reference signals for the transmit antenna and/or delay related to the linear combination to non-legacy user equipment (e.g., user equipment compatible with four or more antenna). Based on such communicated reference signals and delay, the non-legacy user equipment can identify each transmit antenna from each created group of transmit antenna.

Figure 2:
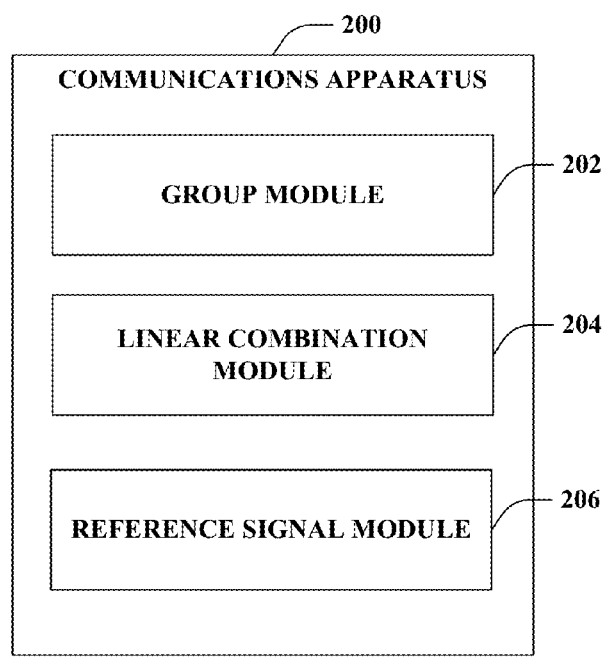
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station (e.g., an eNodeB, a NodeB, etc.) or a portion thereof, a network or a portion thereof, a mobile device or a portion thereof, or substantially any communications apparatus that receives data transmitted in a wireless communications environment. In communications systems, the communications apparatus 200 employ components described below to organizing and/or creating a group of transmit antenna, wherein the number of groups is a number of advertise antenna.

The communications apparatus 200 can include a group module 202. The group module 202 can identify a number of transmit antennas and organize such transmit antennas into groups. In general, the group module 202 can create N groups of transmit antennas, wherein N is a positive integers and is equal to a number of advertised antennas. It is to be appreciated that the group module can create any suitable number of groups with any suitable number of transmit antennas within each group.

The communications apparatus 200 can include a linear combination module 204 that can employ a linear combination technique to each antenna within a group. In other words, the linear combination is applied to all the transmit antennas in each group, wherein the linear combination can convert transmit diversity to frequency diversity for each of the two or more groups. It is to be appreciated and understood that any suitable linear combination can be employed such as, but not limited to, cyclic delay diversity (CDD). It is to be appreciated that the linear combination can be frequency dependent.

The communications apparatus 200 can include a reference signal module 206 that can communicate and/or receive pilot signals (e.g., reference signals) and/or delay utilized with the linear combination. The reference signal module 206 can further be utilized by a user equipment that is aware of the linear combination and delay to identify the transmit antennas within a group regardless of assignment to groups. In other words, the reference signal module 206 can decode or unprecode the reference signals from grouped antenna in order to identify each antenna within each of the groups.

It is to be appreciated that the communications apparatus 200 (and/or the group module 202, the linear combination module 204, and/or the reference signal module 206) can provide at least one of identifying at least two groups of user equipment (UEs), signaling a different number of antennas ports to the least two group of UEs, and/or creating antenna ports corresponding to each group of UEs, wherein each antenna port includes a subset of a number of physical transmit antennas and the number of antenna ports is the number of signaled antenna ports to that group of UEs.

It is to be appreciated that the communications apparatus 200 (and/or the group module 202, the linear combination module 204, and/or the reference signal module 206) can provide at least one of receiving a mapping information that includes at least one of a delay and a linear combination employed to transmit a reference signal related to the set of antenna ports, receiving a reference signal related to the antenna ports, decoding the reference signal related to the set in order to identify each antenna port, wherein the decoding utilizes the mapping information, utilizing a transmitted reference signal for antenna ports of a first group of UEs for at least one of a measurement, a feedback to a base station, or a demodulation technique, and/or utilizing a transmitted reference signals for antenna ports of a second group of UEs for a measurement and a feedback to a base station. It is to be appreciated that the communication apparatus 200 can transmit a reference signal to a group of UEs, wherein the reference signals relates to at least one corresponding advertised antenna port and/or corresponding advertised antenna ports. It is to be further appreciated that the mapping information can include mapping between the physical transmit antennas and at least one antenna ports of a group of UEs.

It is to be appreciated that the communications apparatus 200 can created UE specific antenna ports dynamically over time and can be based upon feedback from the UE. The feedback can be at least one of a Channel quality, a precoding matrix, a rank information, a channel directionality information, and/or channel quality conditions for the antenna ports advertised to only a subset of group of UEs. Moreover, the group of UEs can have different patterns, different density and different periodicity.

Moreover, although not shown, it is to be appreciated that communications apparatus 200 can include memory that retains instructions with respect to identifying a number of transmit antennas, creating one or more groups that include a subset of the number of transmit antennas, wherein each group includes a subset of the number of transmit antennas and the number of groups is a number of advertised antennas, employing a linear combination to convert transmit diversity to frequency diversity for each of the two or more groups, identifying at least two groups of user equipment (UEs), signaling a different number of antennas ports to the least two group of UEs, creating antenna ports corresponding to each group of UEs, wherein each antenna port includes a subset of a number of physical transmit antennas and the number of antenna ports is the number of signaled antenna ports to that group of UEs, and the like. Further, communications apparatus 200 can include a processor that may be utilized in connection with executing instructions (e.g., instructions retained within memory, instructions obtained from a disparate source, . . . ).

Additionally, although not shown, it is to be appreciated that communications apparatus 200 can include memory that retains instructions with respect to receiving a delay related to a linear combination to convert transmit diversity to frequency diversity for a group that includes two or more transmit antennas, receiving a reference signal related to the group, decoding the reference signal related to the group in order to identify each transmit antenna, wherein the decoding utilizes the received delay, receiving a mapping information that includes at least one of a delay and a linear combination employed to transmit a reference signal related to the set of antenna ports, receiving a reference signal related to the antenna ports, decoding the reference signal related to the set in order to identify each antenna port, wherein the decoding utilizes the mapping information, utilizing a transmitted reference signal for antenna ports of a first group of UEs for at least one of a measurement, a feedback to a base station, or a demodulation technique, utilizing a transmitted reference signals for antenna ports of a second group of UEs for a measurement and a feedback to a base station, and the like. Further, communications apparatus 200 can include a processor that may be utilized in connection with executing instructions (e.g., instructions retained within memory, instructions obtained from a disparate source, . . . ).

Figure 3:
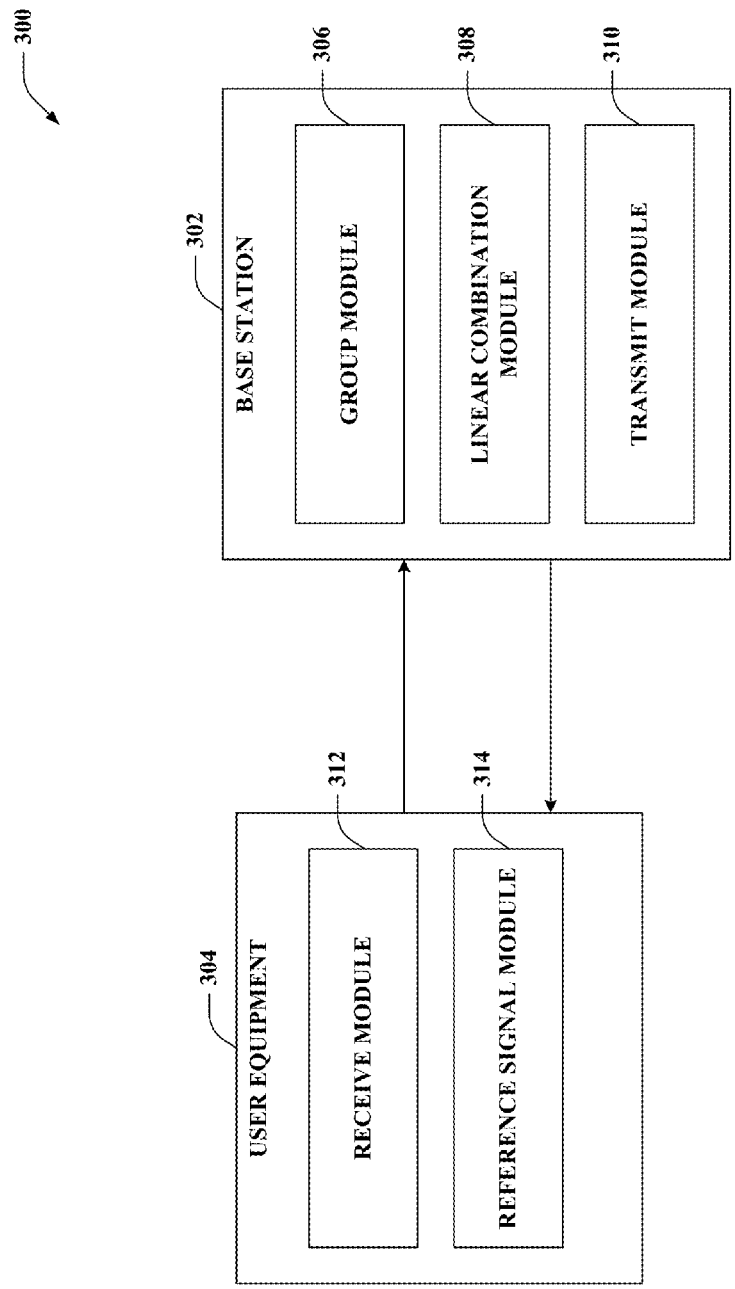
FIG. 3 is an illustration of an example wireless communications system that facilitates grouping transmit antennas to optimize legacy user equipment (UE).

Now referring to FIG. 3, illustrated is a wireless communications system 300 that can group transmit antennas to optimize legacy user equipment (UE). The system 300 includes a base station 302 that communicates with a user equipment 304 (and/or any number of disparate user equipment (not shown)). Base station 302 can transmit information to user equipment 304 over a forward link channel; further base station 302 can receive information from user equipment 304 over a reverse link channel. Moreover, system 300 can be a MIMO system. Additionally, the system 300 can operate in an OFDMA wireless network, a 3GPP LTE wireless network, etc. Also, the components and functionalities shown and described below in the base station 302 can be present in the user equipment 304 as well and vice versa, in one example; the configuration depicted excludes these components for ease of explanation.

Base station 302 includes a group module 306 that can evaluate a number of available transmit antenna and organize such number of available transmit antenna into groups. The group module 306 can create a number of groups that include transmit antenna, wherein the number of groups can be equal to a number of advertise antenna. For instance, there can be 8 transmit antenna and four advertised antenna ports, wherein the group module can create 8 groups, wherein each group can include at least one transmit antenna.

The base station 302 can further include a linear combination module 308 that can employ a linear combination to convert to convert transmit diversity to frequency diversity for each of the one or more groups that include at least two transmit antenna. It is to be appreciated that the linear combination module 308 can employ cyclic delay diversity (CDD) and/or any other suitable linear combination technique.

The base station 302 can further include a transmit module 310 that can communicate or convey a delay related to a linear combination technique. The transmit module 310 can further convey or communicate reference signals for each group of antenna and/or each individual antenna within each group. By conveying such reference signals and/or delay, a user equipment may be able to estimate the channel of each transmit antenna within each group.

It is to be appreciated that the base station 302 (and/or the group module 306, the linear combination module 308, and/or the transmit module 310) can provide at least one of identifying at least two groups of user equipment (UEs), signaling a different number of antennas ports to the least two group of UEs, and/or creating antenna ports corresponding to each group of UEs, wherein each antenna port includes a subset of a number of physical transmit antennas and the number of antenna ports is the number of signaled antenna ports to that group of UEs.

User equipment 304 can include a receive module 312 that can receive the reference signal and/or delay related to the linear combination technique. The user equipment 304 can further include a reference signal module 314. The reference signal module 314 can further be utilized by a user equipment to estimate the channel of the antennas within the group regardless of assignment to groups. In other words, the reference signal module 314 can decode or unprecode the reference signals (utilizing the received delay) from grouped antenna in order to identify each antenna within each of the groups.

It is to be appreciated that the user equipment 304 (and/or the receive module 312 and/or the reference signal module 314) can provide at least one of receiving a mapping information that includes at least one of a delay and a linear combination employed to transmit a reference signal related to the set of antenna ports, receiving a reference signal related to the antenna ports, decoding the reference signal related to the set in order to identify each antenna port, wherein the decoding utilizes the mapping information, utilizing a transmitted reference signal for antenna ports of a first group of UEs for at least one of a measurement, a feedback to a base station, or a demodulation technique, and/or utilizing a transmitted reference signals for antenna ports of a second group of UEs for a measurement and a feedback to a base station.

Moreover, although not shown, it is to be appreciated that base station 302 can include memory that retains instructions with respect to identifying a number of transmit antennas, creating one or more groups that include a subset of the number of transmit antennas, wherein each group includes a subset of the number of transmit antennas and the number of groups is a number of advertised antennas, employing a linear combination to convert transmit diversity to frequency diversity for each of the one or more groups, identifying at least two groups of user equipment (UEs), signaling a different number of antennas ports to the least two group of UEs, creating antenna ports corresponding to each group of UEs, wherein each antenna port includes a subset of a number of physical transmit antennas and the number of antenna ports is the number of signaled antenna ports to that group of UEs, and the like. Further, communications apparatus 200 can include a processor that may be utilized in connection with executing instructions (e.g., instructions retained within memory, instructions obtained from a disparate source, . . . ).

Additionally, although not shown, it is to be appreciated that base station 302 can include memory that retains instructions with respect to receiving a delay related to a linear combination to convert transmit diversity to frequency diversity for a group that includes two or more transmit antennas, receiving a reference signal related to the group, decoding the reference signal related to the group in order to identify each transmit antenna, wherein the decoding utilizes the received delay, receiving a mapping information that includes at least one of a delay and a linear combination employed to transmit a reference signal related to the set of antenna ports, receiving a reference signal related to the antenna ports, decoding the reference signal related to the set in order to identify each antenna port, wherein the decoding utilizes the mapping information, utilizing a transmitted reference signal for antenna ports of a first group of UEs for at least one of a measurement, a feedback to a base station, or a demodulation technique, utilizing a transmitted reference signals for antenna ports of a second group of UEs for a measurement and a feedback to a base station, and the like. Further, communications apparatus 200 can include a processor that may be utilized in connection with executing instructions (e.g., instructions retained within memory, instructions obtained from a disparate source, . . . ).

Multiple transmit antennas can also be used to increase the data rate. In MIMO systems with Nt transmit and Nr receive antennas the capacity scales linearly with min(Nt, Nr).

Cyclic delay diversity (CDD) is a scheme to convert transmit diversity to frequency diversity in OFDM systems. CDD schemes involve transmitting the same signal on different antennas with different delays. In the following example it is shown how CDD converts transmit diversity to frequency diversity. Consider the case when the channel from two transit antennas are H1(f)=H1 and H2(f)=H2, that is, the channels are not frequency selective. Since a delay corresponds to a multiplication by a phase ramp in the frequency domain, the effective channel realization after CDD is proportional to H1+$e^{jfD}$ H2 where D is proportional to the delay introduced on the $2^{nd}$ antenna. Therefore, CDD schemes increase the frequency selectivity of the channel response. If the signal is sent on two OFDM subcarriers that are spaced far apart, there is a diversity of two.

LTE release 8 supports 1, 2, or 4 transmit antenna ports. The number of transmit antenna ports can be advertised through PBCH. A reference signal (RS) can be sent from each antenna port that is used for channel estimation purposes.

LTE-Advanced can have more transmit antennas (e.g., 8, more than 8, etc.) at the base station. Since legacy UEs can only support up to 4 transmit antenna ports, a smaller number of transmit antenna ports than that available in the system is advertised to legacy UEs through PBCH. Let "advertised antenna ports" refer to the antenna ports advertised to legacy UEs and let "all antenna ports" refer to all the antenna ports available in the system. New UEs can be made aware of all available antenna ports through a new mechanism (discussed below).

One technique to support legacy UEs in such a system would be to map one transmit antenna to one antenna port. This would fix the transmit antennas that can be used for transmissions monitored by legacy UEs and may allow use of all antennas only for transmissions monitored by new UEs. However, in such a technique the transmit diversity for legacy UEs is limited to the number of advertised antenna ports. The subject innovation transmit signals that are monitored by legacy UEs that enables legacy UEs to get a transmit diversity that is larger than the number of advertised antenna ports and that does not require any change in the way legacy UEs processes the received signal.

The subject innovation can enable the transmit antennas available in the system to be grouped into N groups, where N is equal to the number of advertised antenna ports. It is to be appreciated that the number of antennas in different groups could be different (e.g., group one has two antenna and group two has three antenna, etc.) and an antenna could belong to more than one group. On each such group, a cyclic delay diversity (CDD) scheme can be utilized to convert transmit diversity to frequency diversity. It is to be appreciated that any suitable linear or non-linear combination can be employed and CDD is just one example. At the receiver, all the antennas within a group can appear as a single transmit antenna port and processing at the receiver is unaffected as long as the delay introduced on different antennas is not too large. For example, consider the case with 8 transmit antennas where 4 transmit antenna ports are advertised to legacy UEs. Antenna 1 and 2 can be grouped to group 1, antenna 3 and 4 to group 2, antenna 5 and 6 to group 3 and antenna 7 and 8 to group 4. All antennas in group N would act like a virtual antenna to the UE by transmitting the signal corresponding to advertised antenna N using CDD. For example, this could be done by transmitting a signal as is on the first antenna in the group and by transmitting the signal delayed by a chip in the second antenna of the group.

Some control channels in LTE Release 8 like PCFICH, PHICH, and PDCCH are spread across the frequency and hence using such a scheme helps improve the performance of legacy UEs. For example for PCFICH, PHICH, and PDCCH of legacy UEs, instead of transmitting on 4 transmit antennas, it can be transmitted on the 4 virtual antennas as done for reference signal (RS) in the previous example.

In order to make use of this diversity in data transmission, the scheduler could schedule UE on PDSCH resources distributed across the frequency. The PDSCH can be transmitted using the same virtual antenna scheme as RS to benefit from this additional diversity. In case of PDSCH transmissions with its own dedicated RS a similar virtual antenna scheme can be employed for the dedicated RS and the corresponding data transmission in PDSCH. The virtual antenna used for data transmission in this case could be different from those used for common RS.

The proposed virtual antenna technique can be employed for both legacy and new UEs for transmission of control for example. It is to be appreciated that a legacy UE can be a UE that is compatible with four or less transmit antennas and a new UE is a UE that is compatible with four or more transmit antenna. Alternately, the virtual antenna technique can be utilized for legacy UEs while for PHICH, PDCCH and PDSCH transmissions to new UEs can use a different approach to get the improved transmit diversity since they could have more pilots and could estimate the channel from the different antennas.

In order to get the higher data rates possible with all available antenna ports, new UEs need to be able to estimate the channel corresponding to all available antenna ports and report the channel quality (CQI, PMI, RI, CDI etc). New reference signals can be sent for all the antenna ports to be used by the new UEs in addition to the reference signals already being transmitted for legacy UEs. Alternately, new reference signals can be designed such that they can be used together with the legacy RS for channel estimation of all transmit antennas for feedback and measurement purposes. The reference signals can be unprecoded and can represent the directions not covered by the legacy RS. They can also be precoded and provide directions of the precoded channel not provided by the legacy RS.

For example, consider the same example as before where 8 Tx antennas are grouped into 4 group with group 1 corresponding to antenna 1 and 2, group 2 containing antenna 3,4 and so on. Let $h_i(t)$ (for i=1 to 8, t denotes time) denote the channel corresponding to the i-th transmit antenna. Due to the CDD scheme where the transmit signal from one of the antennas is delayed by one chip, to UEs the effective antenna gain on the common RS appears to $h_1(t)+h_2(t-T_c)$ corresponding to RS of group 1, $h_3(t)+h_4(t-T_c)$ corresponding to group 2 and so on. $T_c$ is the chip duration.

Four new sets of pilots can be transmitted such that the effective channel gain from pilot set 1 is $h_1(t)-h_2(t-T_c)$, from pilot set 2 is $h_3(t)-h_4(t-T_c)$ and so on. This could be done by transmitting X(t) from one antenna and $-X(t-T_c)$ from the next antenna. It is therefore possible to get estimates of $h_i(t)$ by using the common RS and the new pilots. In this specific example, the common RS gives estimate of $h_{2i-1}(t)+h_{2i}(t-T_c)$ while the new pilots gives an estimate of $h_{2i}(t-T_c)$. The sum and difference of these estimates scaled and shifted suitably yield estimates of $h_{2i-1}(t)$ and $h_{2i}(t)$.

More generally, the new reference signals in conjunction with the legacy common RS can be able to detect the channel gains from all antennas efficiently. The new reference signals can be sent in directions orthogonal to the directions in common RS and should be orthogonal to each other.

In summary the subject innovation can provide the use of CDD (or any suitable linear combination) between antenna pairs in 8 Tx antenna system to provide additional diversity for legacy UEs with complete transparency to these UEs. Additionally, the subject innovation can provide new additional Reference Signals designed such that combined with the reference signals sent for legacy UEs can enable LTE-A UEs to estimate channel from all the antennas.

To support higher data rates, MIMO systems with large number of antennas (up to 8) are envisioned in LTE-A. Therefore, it is required to provide mechanisms by which UEs or a group of UEs can obtain estimates of all the antennas involved in transmission of different information. LTE standard currently supports Reference Signals for up to 4 antenna ports.

The subject innovation provides a scheme to support Reference signal for additional 4 antennas. Orthogonal multiplexing of the reference signals for different antenna ports can be provided using different time shifts. For example, RS of antenna 1 and 5 are sent on RS resource for antenna 1. RS of antenna 5 is delayed by some chip durations, for example CP/2 chips. In this case, reference signal of multiple antennas will be transmitted on same frequency-time resources. Transmitted reference signal corresponding to each antenna will have different phase ramps in frequency. The reference signal for all the antennas multiplexed onto the same set of resources will be different only in the frequency dependent phase shift.

To legacy UEs the multiple antennas that use the same time frequency resources for the RS would appear as one virtual antenna and if all their signals are sent in a similar fashion, they will not be impacted. If the delay spread of the channel from the antennas in a group is known to be small (e.g., within a fraction of the cyclic prefix), the new UEs may be able to estimate the channels from different antennas within a group from the received signal corresponding to RS of this group.

The LTE-A UE can use the particular information on the multiplexing of the reference signals and phase ramps to estimate channel information for all the antennas. This information can be static and pre-configured or can be adaptive and configurable. LTE-A UE will be informed of this information by some mechanisms such as new system information block (SIB) sent on common channels.

Figure 4:
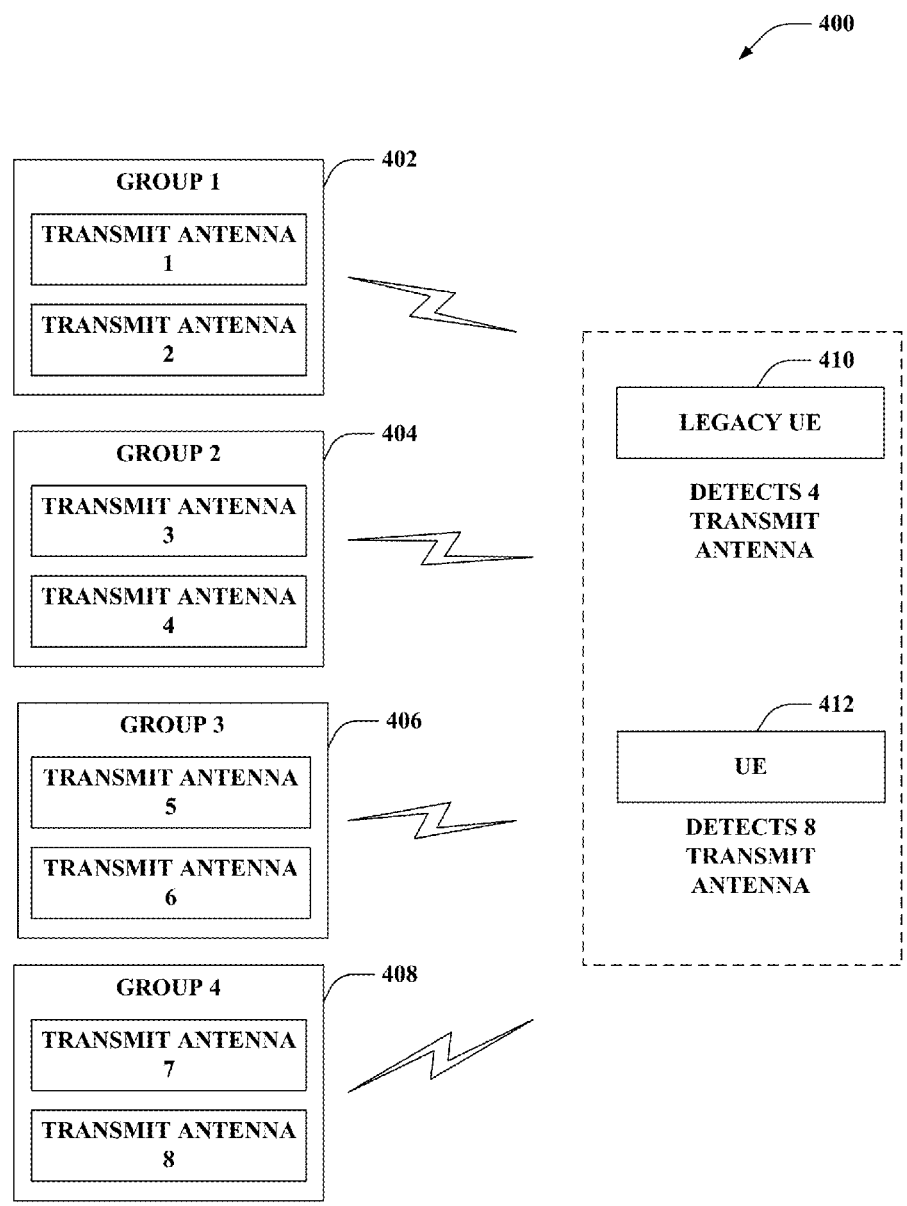
FIG. 4 is an illustration of an example system that facilitates organizing transmit antenna.

Now referring to FIG. 4, an example wireless communications system 400 can organize two or more transmit antenna. The system 400 is utilized for exemplary purposes and is not to be limiting on the subject innovation. For example, the system 400 can utilize any suitable number of transmit antenna, any suitable number of groups for the transmit antenna, and any suitable number of transmit antenna within each group. The system 400 can include eight transmit antenna (e.g., transmit antenna 1, transmit antenna 2, transmit antenna 3, transmit antenna 4, transmit antenna 5, transmit antenna 6, transmit antenna 7, and transmit antenna 8), which can be organized into four groups such as group 1 402, group 2 404, group 3 406, and group 4 408.

Based on the grouping of the transmit antennas, each group of transmit antennas can employ a linear combination technique (e.g., cyclic delay diversity (CDD), etc.) to convert transmit diversity to frequency diversity for each of the two or more groups. Thus, a legacy user equipment (UE) 410 can identify each group of the transmit antennas (e.g., group 1 402, group 2 404, group 3 406, and group 4 408). This allows employment of each transmit antenna whether or not the legacy user equipment 410 is compatible with less than four transmit antennas. In other words, the legacy user equipment 410 detects four transmit antenna based on the four groups. A user equipment 412 (e.g., a non-legacy user equipment, a user equipment that is compatible to utilize four or more transmit antenna) can further utilize each of the transmit antenna regardless of the groupings of transmit antenna. The user equipment 412 can receive a delay related to the linear combination as well as reference signals for the groups of transmit antenna and/or each transmit antenna. Based on such received delay and/or reference signals, the user equipment 412 can decode or unprecode and detect each transmit antenna—here all eight (8) transmit antenna.

According to one aspect, transmit antennas available in the wireless communication system are grouped into N groups, where N is equal to the number of advertised antennas. According to one aspect, the number of antennas in different groups may be different. Additionally, each of the N groups use cyclic delay diversity to convert transmit diversity to frequency diversity. At the receiver, e.g., UEs, all the antennas within a group appear as a single transmit antenna and the processing at the receiver is unaffected as long as the delay introduced on different antennas is not too large. For example, in one aspect 8 transmit antennas are implemented and 4 transmit antennas are advertised to legacy UEs. Antenna 1 and 2 are grouped in group 1, antenna 3 and 4 are grouped in group 2, antenna 5 and 6 are grouped in group 3 and antenna 7 and 8 are grouped in group 4. All antennas in group N would act like a virtual antenna to the UE by transmitting the signal corresponding to advertised antenna N using CDD. For example, in one aspect, the signal is transmitted as-is on the first antenna in the group and the signal is transmitted delayed by a chip in the second antenna of the group.

It should be noted that some control channels in LTE Release 8 like Physical Control Format Indicator Channel (PCFICH), Physical H-ARQ Indication Channel (PHICH), and Physical Downlink Control Channel (PDCCH) are spread across the frequency and hence using the aspects herein described helps improve the performance of legacy UEs. For example for PCFICH, PHICH, and PDCCH of legacy UEs, instead of transmitting on 4 transmit antennas, we transmit on the 4 virtual antennas as done for the Reference Signal (RS) in the previous example. Thus, it is to be appreciated that the subject innovation can transmit at least one of Reference Signals (RS), Physical Control Format Indicator Channel (PCFICH), Physical Hybrid ARQ Channel (PHICH), and Physical Downlink Control Channel (PDCCH), and PDSCH to a group of UEs using the antenna ports advertised to the group of UEs.

In accordance with an aspect, in order to make use of the transmit diversity in data transmission, the scheduler may schedule UE on PDSCH resources distributed across the frequency. The PDSCH can be transmitted using the same virtual antenna scheme as RS to benefit from this additional diversity. In the case of PDSCH transmissions with their own dedicated RS a similar virtual antenna scheme can be employed for the dedicated RS and the corresponding data transmission in PDSCH. According to one aspect, the virtual antenna scheme in this case could be different from that for common RS.

In accordance with one or more aspects, the proposed virtual antenna technique may be employed for both legacy and new UEs. Alternately, the virtual antenna technique may be used for legacy UEs while for PHICH, PDCCH and PDSCH transmissions to non-legacy UEs could use a different approach to obtain the improved transmit diversity since the non-legacy UEs may have more pilots and may estimate the channel from the different antennas.

In order to obtain the higher data rates possible with all available transmit antennas, for data demodulation, non-legacy UEs need to be able to estimate the precoded channel corresponding to all transmitted beams. In one aspect, new pilots (dedicated reference signals) can be transmitted in the PDSCH region to aid in the precoded channel estimation. The new pilots can be precoded using the same beams as used for data transmission and can provide the precoded channel estimate of all beams. Alternately the Reference Signal sent for legacy devices is implemented and new pilots (dedicated reference signals) can be designed such that they can be used together with the legacy RS for channel estimation for data demodulation. For example, the reference signals can be un-precoded or use fixed precoding independent of that used for data and can represent the directions not covered by the legacy RS. The precoded channel for data demodulation can then be estimated using the legacy RS as well as the new pilots and utilizing the mapping between the transmit beams and the directions of legacy RS and new pilots In other aspects, the reference signals can also be precoded for specific UEs and provide directions of the precoded channel not provided by the legacy RS.

Therefore, according to some aspects, the channel estimation for demodulation can be done jointly with the use of the legacy RS and the new dedicated RS provided for non-legacy UEs. The new dedicated RS can provide information about channel along the direction of the beams used (and the precoding operation performed) in transmission to the UE. In some aspects, the dedicated RS may represent the entire precoded channel or, in the alternative, it may represent the direction of the precoded channel not represented by the legacy RS. The Precoded channel can correspond to the channel between the UE and the antennas at a single cell for higher order MIMO operation, or between the UE and the antennas from different cells cooperating in a network MIMO operation.

According to some aspects, DL control signaling to the UE may provide some information about the precoding matrix (or the beam directions) used for transmission to the UE. These beam directions can correspond to the beams formed by antennas of a single cell equipped with multiple antennas (possibly up to 8 for LTE-A) or the beams formed by the antennas of multiple cells (or sites) participating in cooperative transmission schemes involving the UE. These cooperative schemes can be in different forms such as, for example, distributed beam-forming or, alternatively, joint processing and signal processing.

According to some aspects, the information conveyed by the control signaling to the UE may be of different types:

A) Precoding matrix indicator corresponding to the entire channel. In this case the dedicated RS may represent the channel along directions not covered by the legacy RS and the UE can perform joint channel estimation using the legacy RS and the dedicated RS.

B) Precoding matrix indicators corresponding to the directions of the precoded channel represented by the legacy RS. In this case, dedicated RS represents the directions of the precoded channel not represented by the legacy RS. The UE obtains estimate of the entire precoded channels by using the precoding information corresponding to the legacy RS and the precoded dedicated RS.

C) Indicators to the precoding vectors used by all (or some) of the cells involved in cooperation scheme involving the UE.

In scenarios where frequency-dependent precoding operation is used, i.e. multiple precoding matrices are used for different parts of the band, the DL control signaling may convey information about some or all of them.

Figure 5:
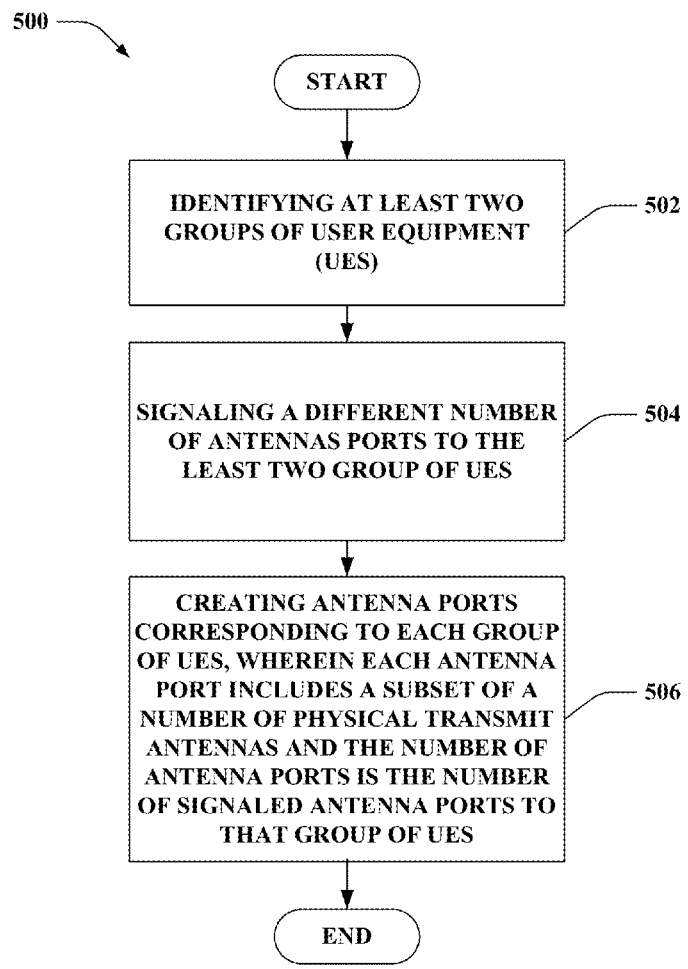
FIG. 5 is an illustration of an example methodology that facilitates optimizing Long Term Evolution Advance (LTE A).
Figure 6:
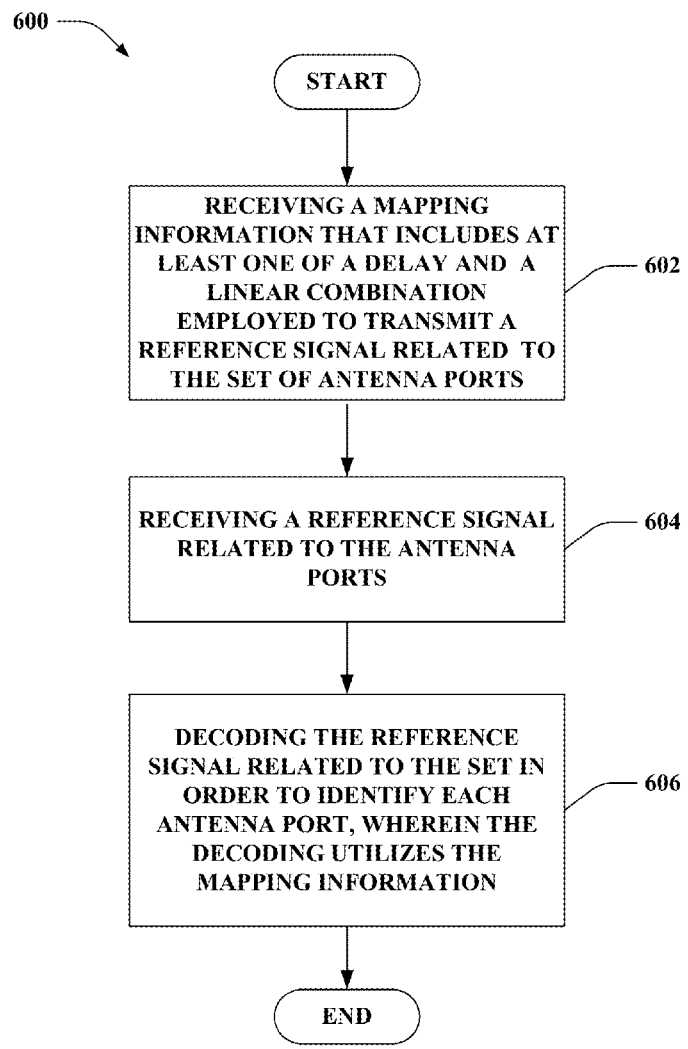
FIG. 6 is an illustration of an example methodology that facilitates identifying transmit antenna.

Referring to FIGS. 5-6, methodologies relating to grouping transmit antenna for legacy user equipment and communicating delay information for user equipment (UE) are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates optimizing Long Term Evolution Advance (LTE A). At reference numeral 502, at least two groups of user equipment (UEs) can be identified. At reference numeral 504, a different number of antennas ports can be signaled to the least two group of UEs. At reference numeral 506, antenna ports corresponding to each group of UEs can be created, wherein each antenna port includes a subset of a number of physical transmit antennas and the number of antenna ports is the number of signaled antenna ports to that group of UEs.

Now referring to FIG. 6, a methodology 600 that facilitates identifying a set of antenna ports. At reference numeral 602, a mapping information can be received that includes at least one of a delay and a linear combination employed to transmit a reference signal related to the set of antenna ports. At reference numeral 604, a reference signal related to the antenna ports can be received. At reference numeral 608, the reference signal related to the set can be decoded in order to identify each antenna port, wherein the decoding utilizes the mapping information.

Moreover, although not shown, the methodology 600 can further comprise utilizing a transmitted reference signal for antenna ports of a first group of UEs for at least one of a measurement, a feedback to a base station, or a demodulation technique, and utilizing a transmitted reference signals for antenna ports of a second group of UEs for a measurement and a feedback to a base station.

Figure 7:
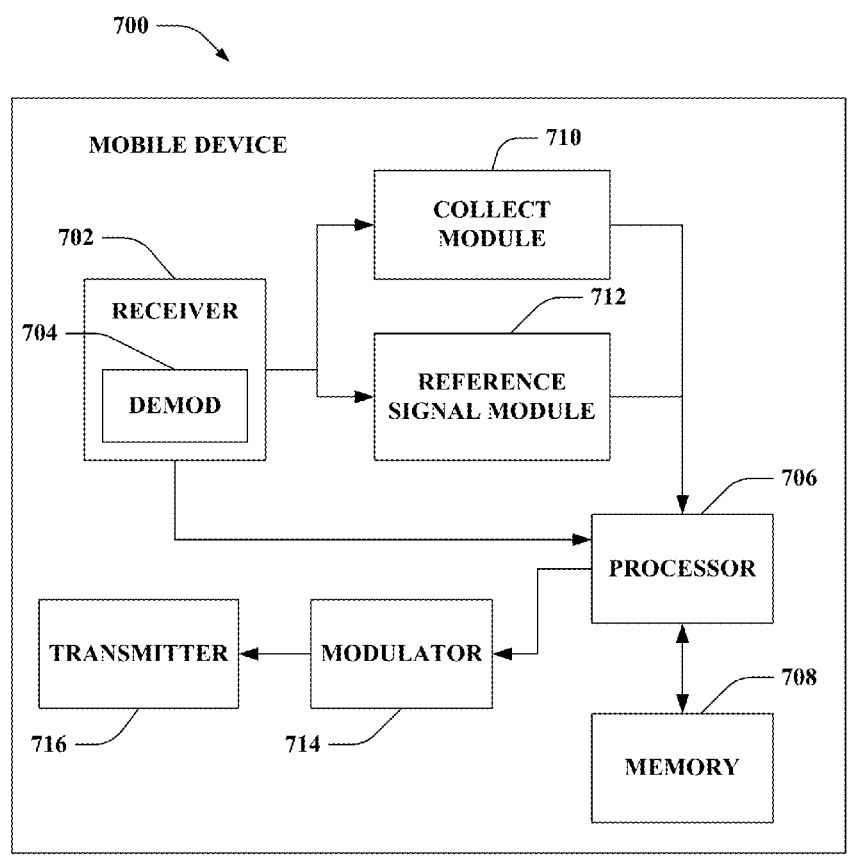
FIG. 7 is an illustration of an example mobile device that facilitates creating transmit antenna groups in a wireless communication system.

FIG. 7 is an illustration of a mobile device 700 that facilitates creating transmit antenna groups in a wireless communication system. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to a collect module 710 and/or a reference signal module 712. The collect module 710 can receive delays utilized for the linear combination techniques for each group that includes transmit antenna. The collect module 710 can further receive reference signals related to each create group of transmit antenna, wherein each group includes at least one transmit antenna from a number of available transmit antenna. The reference signal module 712 can leverage the collected data (e.g., the delay and/or the reference signals) to unprecode or decode and identify each transmit antenna included within each group. Thus, the reference signal module 710 can allow identification of available transmit antenna assigned to the created groups.

Mobile device 700 still further comprises a modulator 714 and transmitter 716 that respectively modulate and transmit signals to, for instance, a base station, another mobile device, etc. Although depicted as being separate from the processor 606, it is to be appreciated that the collect module 710, reference signal module 712, demodulator 704, and/or modulator 714 can be part of the processor 706 or multiple processors (not shown).

Figure 8:
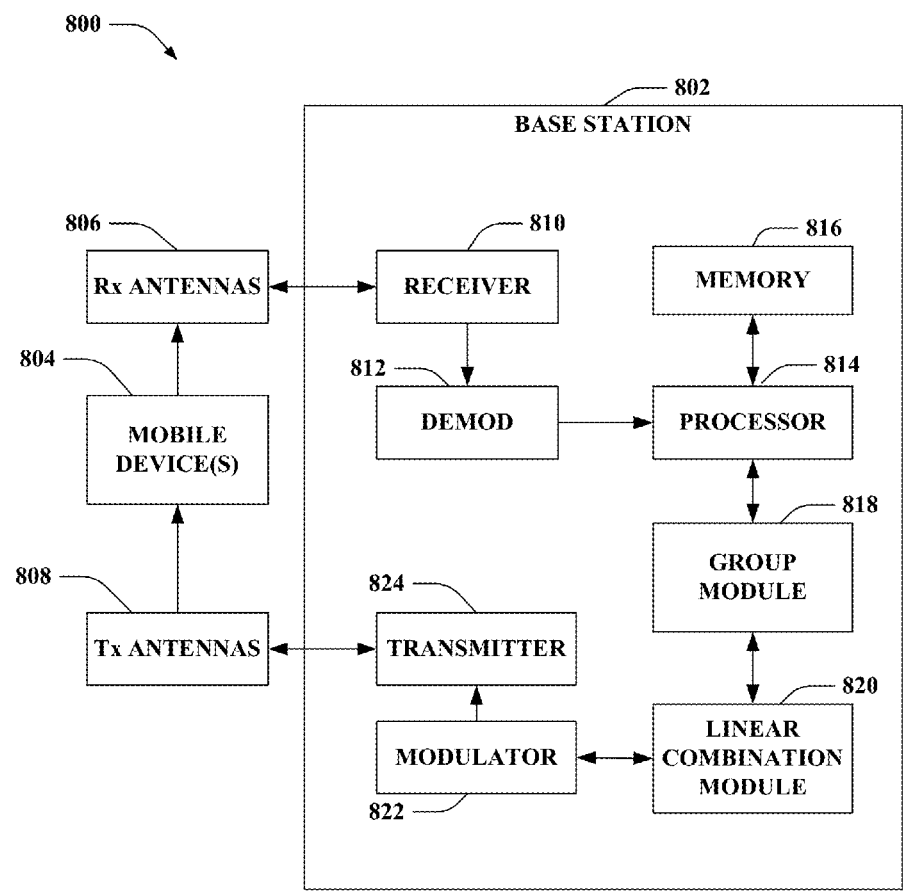
FIG. 8 is an illustration of an example system that facilitates enhancing transmit antenna utilization in a wireless communication environment.

FIG. 8 is an illustration of a system 800 that facilitates enhancing transmit antenna utilization in a wireless communication environment as described supra. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein.

Processor 814 is further coupled to a group module 818 and/or a linear combination module 820. The group module 818 can identify available transmit antenna and organize the available transmit antenna into N groups, where N is a positive integer and a number of advertise antenna. The linear combination module 820 can employ a linear combination technique such as, but not limited to, cyclic delay diversity to each antenna within a group. Furthermore, although depicted as being separate from the processor 814, it is to be appreciated that the group module 818, linear combination module 820, demodulator 812, and/or modulator 822 can be part of the processor 814 or multiple processors (not shown).

Figure 9:
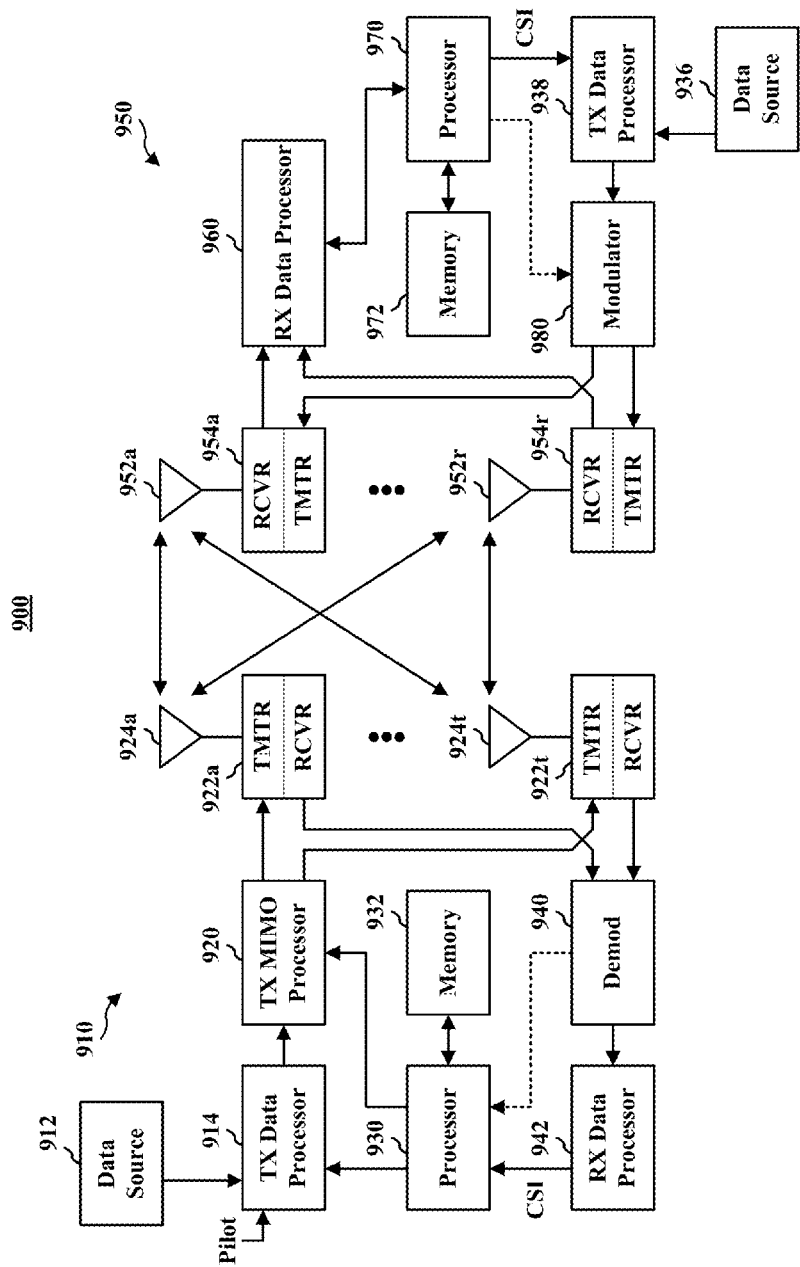
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), techniques/configurations (FIG. 4) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
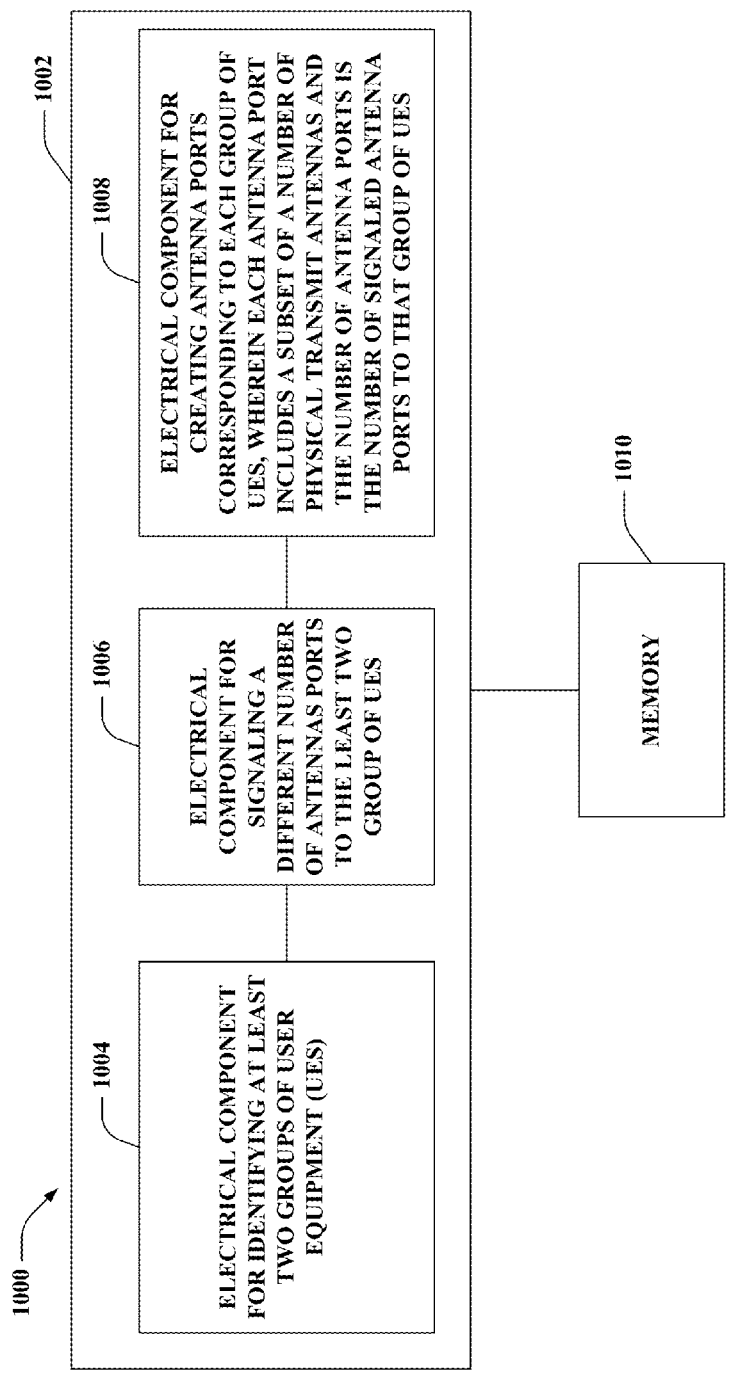
FIG. 10 is an illustration of an example system that facilitates optimizing Long Term Evolution Advance (LTE A).

With reference to FIG. 10, illustrated is a system 1000 that optimizes Long Term Evolution Advance (LTE A). For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. The logical grouping 1002 can include an electrical component for identifying at least two groups of user equipment (UEs) 1004. In addition, the logical grouping 1002 can comprise an electrical component for signaling a different number of antennas ports to the least two group of UEs 1006. Moreover, the logical grouping 1002 can include an electrical component for creating antenna ports corresponding to each group of UEs, wherein each antenna port includes a subset of a number of physical transmit antennas and the number of antenna ports is the number of signaled antenna ports to that group of UEs 1008. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
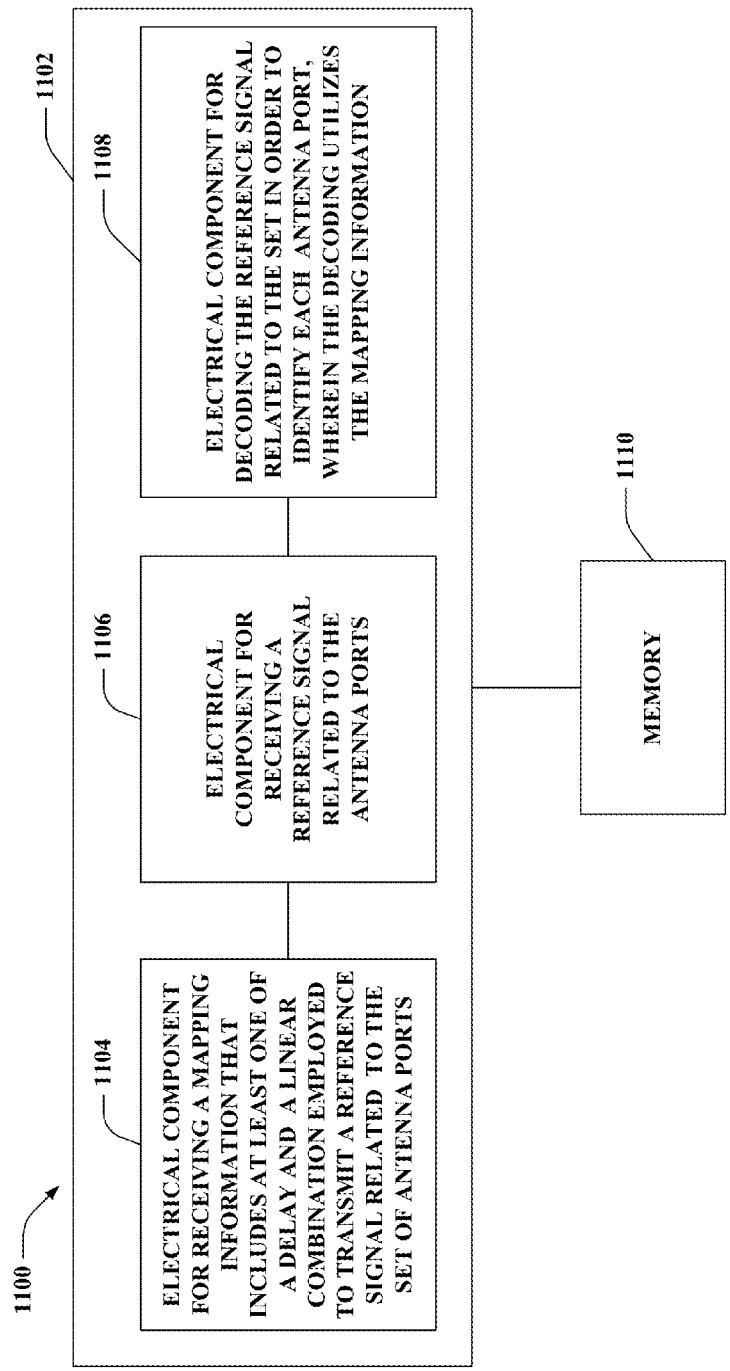
FIG. 11 is an illustration of an example system that identifying transmit antenna in a wireless communication environment.

Turning to FIG. 11, illustrated is a system 1100 that identifying transmit antenna in a wireless communication environment. System 1100 can reside within a base station, mobile device, etc., for instance. As depicted, system 1100 includes functional blocks that can represent functions implemented by a processor, software, or combination thereof (e.g., firmware). Logical grouping 1102 can include an electrical component for receiving a mapping information that includes at least one of a delay and a linear combination employed to transmit a reference signal related to the set of antenna ports 1104. Moreover, logical grouping 1102 can include an electrical component for receiving a reference signal related to the antenna ports 1106. Further, logical grouping 1102 can comprise an electrical component for decoding the reference signal related to the set in order to identify each antenna port, wherein the decoding utilizes the mapping information 1108. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method used in a wireless communications system that facilitates identifying a set of two or more antenna ports, comprising:
   receiving a mapping information that includes a linear combination employed to transmit a reference signal representing the set of two or more antenna ports, wherein the linear combination is employed to group a plurality of more than four physical transmit antennas into virtual antennas, thereby allowing user equipment that are able to utilize only up to four transmit antenna ports to utilize the more than four physical transmit antennas;
   receiving the reference signal representing the set of two or more antenna ports; and
   decoding, based on the mapping information, the reference signal representing the set of two or more antenna ports in order to identify each antenna port of the set of two or more antenna ports.

2. The method of claim 1, further comprising estimating a channel corresponding to each of a transit antenna ports.

3. The method of claim 1, further comprising:
   receiving the mapping information that relates to at least one physical transmit antennas to antenna ports of a group of UEs; and
   estimating channel of the physical transmit antennas.

4. The method of claim 1, wherein the linear combination is cyclic delay diversity (CDD).

5. An apparatus for wireless communication, comprising:
   at least one processor configured to:
   receive a mapping information that includes a linear combination employed to transmit a reference signal representing a set of two or more antenna ports, wherein the linear combination is employed to group a plurality of more than four physical transmit antennas into virtual antennas, thereby allowing user equipment that are able to utilize only up to four transmit antenna ports to utilize the more than four physical transmit antennas;
   receive the reference signal representing the set of two or more antenna ports; and
   decode, based on the mapping information, the reference signal representing the set of two or more antenna ports in order to identify each antenna port of the set of two or more antenna ports; and
   a memory coupled to the at least one processor.

6. The apparatus of claim 5, wherein the at least one processor is further configured to:
   receive the mapping information related to at least one physical transmit antennas to antenna ports of a group of UEs; and
   estimate channel of the physical transmit antennas.

7. The apparatus of claim 5, wherein the at least one processor is further configured to estimate a channel corresponding to each of a transmit antenna ports.

8. The apparatus of claim 5, wherein the linear combination is cyclic delay diversity (CDD).

9. A wireless communications apparatus that identifying a set of two or more antenna ports within a wireless communications environment, comprising:
   means for receiving a mapping information that includes a linear combination employed to transmit a reference signal representing the set of two or more antenna ports, wherein the linear combination is employed to group a plurality of more than four physical transmit antennas into virtual antennas, thereby allowing user equipment that are able to utilize only up to four transmit antenna ports to utilize the more than four physical transmit antennas;
   means for receiving the reference signal representing the set of two or more antenna ports; and
   means for decoding, based on the mapping information, the reference signal representing the set of two or more antenna ports in order to identify each antenna port of the set of two or more antenna ports.

10. The wireless communications apparatus of claim 9, further comprising:
    means for receiving the mapping information related to at least one physical transmit antennas to antenna ports of a group of UEs; and
    means for estimating channel of the physical transmit antennas.

11. The wireless communications apparatus of claim 9, further comprising means for estimating a channel corresponding to each of a transmit antenna ports.

12. The wireless communications apparatus of claim 9, wherein the linear combination is cyclic delay diversity (CDD).

13. A non-transitory computer-readable medium comprising:
    code for causing at least one computer to receive a mapping information that includes a linear combination employed to transmit a reference signal representing a set of two or more antenna ports, wherein the linear combination is employed to group a plurality of more than four physical transmit antennas into virtual antennas, thereby allowing user equipment that are able to utilize only up to four transmit antenna ports to utilize the more than four physical transmit antennas;
    code for causing at least one computer to receive the reference signal representing the set of two or more antenna ports; and
    code for causing at least one computer to decode, based on the mapping information, the reference signal representing the set of two or more antenna ports in order to identify each antenna port of the set of two or more antenna ports.

14. The computer-readable medium of claim 13, further comprising:
    code for causing at least one computer to receive the mapping information related to at least one physical transmit antennas to antenna ports of a group of UEs; and
    code for causing at least one computer to estimate channel of the physical transmit antennas.

15. The computer-readable medium of claim 13, further comprising code for causing at least one computer to estimate a channel corresponding to each of a transmit antenna ports.

16. The computer-readable medium of claim 13, wherein the linear combination is cyclic delay diversity (CDD).

17. The method of claim 1, wherein the mapping information further includes delay related to the linear combination.

* * * * *